United States Patent
Chiba (10) Patent No.: US 12,377,853 B2
(45) Date of Patent: Aug. 5, 2025

(54) UTILITY VEHICLE AND METHOD FOR CONTROLLING UTILITY VEHICLE

(71) Applicant: KAWASAKI MOTORS, LTD., Hyogo (JP)

(72) Inventor: Junji Chiba, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 523 days.

(21) Appl. No.: 17/837,421

(22) Filed: Jun. 10, 2022

(65) Prior Publication Data

US 2023/0398991 A1    Dec. 14, 2023

(51) Int. Cl.
| | | |
|---|---|---|
| *B60W 30/182* | (2020.01) | |
| *B60W 10/11* | (2012.01) | |
| *B60W 10/119* | (2012.01) | |
| *B60W 30/19* | (2012.01) | |

(52) U.S. Cl.
CPC .......... *B60W 30/182* (2013.01); *B60W 10/11* (2013.01); *B60W 10/119* (2013.01); *B60W 30/19* (2013.01); *B60W 2300/185* (2013.01); *B60W 2510/1005* (2013.01); *B60W 2520/10* (2013.01); *B60W 2720/403* (2013.01)

(58) Field of Classification Search
CPC .. B60W 30/182; B60W 10/11; B60W 10/119; B60W 30/19; B60W 2300/185; B60W 2510/1005; B60W 2520/10; B60W 2720/403; B60W 30/143; B60W 2720/10; B60W 50/082

See application file for complete search history.

(56) References Cited

U.S. PATENT DOCUMENTS

| | | | | |
|---|---|---|---|---|
| 8,585,088 | B1 * | 11/2013 | Kaku | B62D 21/183 |
| | | | | 280/848 |
| 9,902,393 | B2 * | 2/2018 | Endo | B60W 60/0051 |
| 10,035,431 | B2 * | 7/2018 | Mochizuki | B60L 15/2045 |
| 10,647,329 | B2 * | 5/2020 | Cohen | B60W 10/04 |
| 2003/0135320 | A1 * | 7/2003 | Bellinger | B60W 10/10 |
| | | | | 701/103 |
| 2005/0197761 | A1 * | 9/2005 | Bidner | F01L 1/3442 |
| | | | | 123/339.11 |

(Continued)

FOREIGN PATENT DOCUMENTS

| | | | | |
|---|---|---|---|---|
| CN | 108569284 A | * | 9/2018 | ............ B60W 10/20 |
| CN | 208159287 U | * | 11/2018 | |

(Continued)

*Primary Examiner* — Redhwan K Mawari
(74) *Attorney, Agent, or Firm* — Wenderoth, Lind & Ponack, L.L.P.

(57) ABSTRACT

A utility vehicle includes: a plurality of wheels mounted with low-pressure tires; an output operating element that is operated by a driver and receives an increase/decrease instruction to increase or decrease a driving force; a switching operating element that receives a switching instruction for switching between travel modes; and a controller. The controller has a manual travel mode in which the driving force is controlled in accordance with an amount of operation on the output operating element, and a control travel mode in which the driving force is controlled so as to maintain a travel speed at a target speed that is set within a predetermined speed range, the control travel mode being executed in response to an input on the switching operating element.

17 Claims, 8 Drawing Sheets

(56) References Cited

U.S. PATENT DOCUMENTS

| | | | |
|---|---|---|---|
| 2009/0088293 A1* | 4/2009 | Sawada | B60W 30/1843 |
| | | | 477/92 |
| 2009/0221195 A1* | 9/2009 | Suzuki | B63H 21/213 |
| | | | 440/86 |
| 2011/0115318 A1* | 5/2011 | Hashimoto | B60K 6/48 |
| | | | 310/78 |
| 2013/0090202 A1* | 4/2013 | Hiraiwa | B60K 6/365 |
| | | | 475/5 |
| 2014/0163798 A1* | 6/2014 | Ross | B60W 30/00 |
| | | | 903/930 |
| 2017/0183006 A1* | 6/2017 | Chack | B60K 31/04 |
| 2021/0024100 A1* | 1/2021 | Calleija | G08G 1/202 |
| 2021/0034079 A1* | 2/2021 | Yamaguchi | G05D 1/0094 |
| 2021/0394798 A1* | 12/2021 | Kim | B60T 7/042 |

FOREIGN PATENT DOCUMENTS

| | | |
|---|---|---|
| EA | 022854 B1 * | 3/2016 |
| JP | 2019018766 A * | 2/2019 |

* cited by examiner

UTILITY VEHICLE AND METHOD FOR CONTROLLING UTILITY VEHICLE

BACKGROUND OF THE INVENTION

Field of the Invention

The present invention relates to a utility vehicle and a method for controlling the utility vehicle.

Related Art

A utility vehicle disclosed in U.S. Pat. No. 8,585,088 B1, for example, may be used off-road. The off road has large changes in road surface situations, such as the unevenness and gradient of the road surface. Therefore, during off-road traveling, more complicated driving operations are required as compared with traveling on paved roads.

SUMMARY OF THE INVENTION

An object of the present disclosure is to provide a utility vehicle that simplifies driving operations during off-road traveling, and a method for controlling the utility vehicle.

A first aspect of the present disclosure provides a utility vehicle including: a plurality of wheels mounted with low-pressure tires; a drive source that generates a driving force for rotationally driving the plurality of wheels; an output operating element that is operated by a driver and receives an increase/decrease instruction to increase or decrease the driving force; a switching operating element that is operated by the driver and receives a switching instruction for switching between travel modes; and a controller that has a manual travel mode in which the driving force is controlled in accordance with an amount of operation on the output operating element, and a control travel mode in which the driving force is controlled so as to maintain a travel speed at a target speed that is set within a predetermined speed range, the control travel mode being executed in response to an input on the switching operating element.

A second aspect of the present disclosure provides a method for controlling a utility vehicle including a plurality of wheels mounted with low-pressure tires, a drive source that generates a driving force for rotationally driving the plurality of wheels, an output operating element that is operated by a driver and receives an increase/decrease instruction to increase or decrease the driving force, and a switching operating element that is operated by the driver and receives a switching instruction for switching between travel modes, the method including: executing a manual travel mode in which the driving force is controlled in accordance with an amount of operation on the output operating element; switching from the manual travel mode to a control travel mode in response to an input on the switching operating element; and controlling the driving force so as to maintain a travel speed at a target speed that is set within a predetermined speed range, in the control travel mode.

According to the above, during the execution of the control travel mode, the driver does not need to operate the output operating element, and the controller controls the drive source so as to maintain the travel speed within the predetermined speed range. This allows the driver to omit the output operation. Simplified driving operations during off-road traveling are allowed, and convenience is improved. It should be noted that the driving force is transmitted to the road surface through low-pressure tires. It is possible to alleviate the fluctuations in the driving force required for maintaining the travel speed within the predetermined speed range with respect to the fluctuations in road surface resistance on the off road. As a result, in the control of the traveling speed in the control travel mode, the control of the drive source can be facilitated, and the traveling speed can be easily maintained even on the off road.

DETAILED DESCRIPTION OF THE EMBODIMENTS

Embodiments will be described with reference to the accompanying drawings. The same or corresponding elements are denoted by the same reference signs throughout the drawings, and the duplicate detailed description thereof will thus not be given here. The direction is based on the direction viewed from a driver on a driver's seat.

Figure 1:
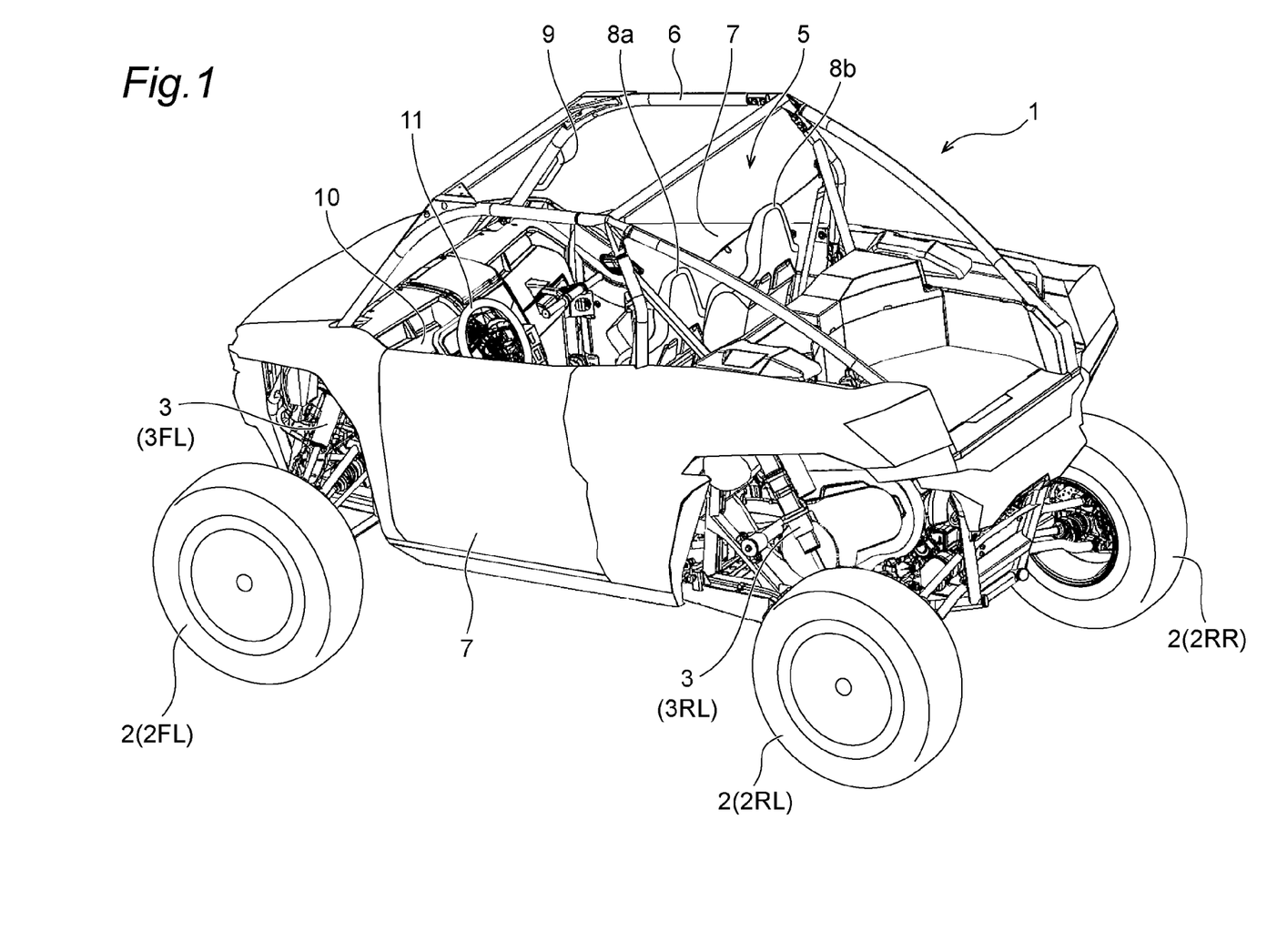
FIG. 1 is a perspective view of a utility vehicle according to a first embodiment.

Referring to FIG. 1, a utility vehicle 1 is used for various purposes, including leisure purposes such as trekking driving through a rocky area, a desert, or a forest while looking out over the surrounding scenery, and agricultural work purposes such as spraying of fertilizer, water, agricultural chemicals, and the like on a farm. A cargo bed is provided in the rear of the vehicle. The cargo bed is expected to be loaded with agricultural work equipment, harvests, fertilizers, spare tires, and recreational items (cooler boxes, tents, chairs, tables, or the like), depending on the intended use of the utility vehicle 1.

The utility vehicle 1 includes four wheels 2 including a front right wheel 2FR (see FIG. 2), a front left wheel 2FL, a rear right wheel 2RR (see FIG. 2), and a rear left wheel 2RL. The wheels 2 are mounted with low-pressure tires. The low-pressure tire is also referred to as a balloon tire. The low-pressure tire is filled with a relatively low air pressure of, for example, 300 kPa or less, specifically, about 200 kPa. This makes it easier to increase the ground contact surface as compared with high-pressure tires, and to improve the grip on an uneven ground. Each of the wheels 2 is suspended by a body frame 4, with a corresponding suspension device 3 interposed therebetween. In the present specification and the drawings, the symbols "FR", "FL", "RR", and "RL" added to the reference numerals of the elements individually corresponding to the wheels 2 indicate that they correspond to the front right wheel 2FR, the front left wheel 2FL, the rear right wheel 2RR, and the rear left wheel 2RL, respectively.

A boarding space 5 is formed between the front wheels 2FR, 2FL and the rear wheels 2RR, 2RL in the front-rear direction. The boarding space 5 is surrounded by a roll over protective structure (ROPS) 6 and a pair of side doors 7. In the boarding space 5, two seats 8a and 8b are installed side by side. One of the two seats is a driver's seat 8a for a driver, and the other seat is a passenger seat 8b for a passenger.

A grip 9 that is gripped by the passenger in order to stabilize the sitting posture is provided around the passenger seat 8b. The grip 9 is attached to a location that is easily accessible to the passenger on the passenger seat 8b, such as the ROPS 6, a panel in front of the passenger seat 8b, or a center console (not illustrated) between the seats 8a and 8b.

Figure 2:
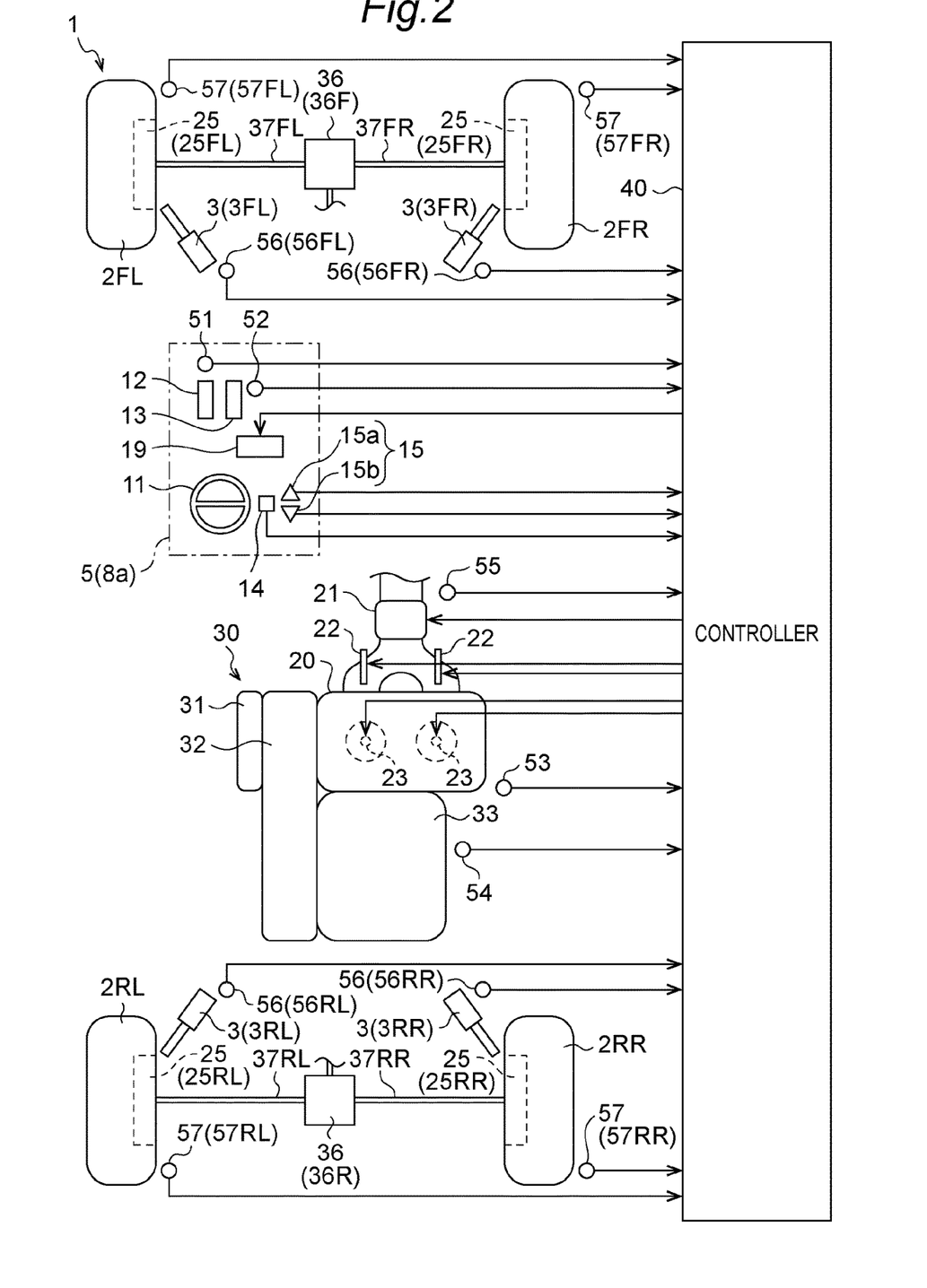
FIG. 2 is a conceptual diagram showing a configuration of the utility vehicle shown in FIG. 1.

Referring to FIGS. 1 and 2, an instrument panel 10 is provided in front of the driver's seat 8a, and a display device 19 is provided on the instrument panel 10. The display device 19 may be a meter and a lamp, or may be a liquid crystal panel that displays character information and image information. The display device 19 displays the current traveling speed and the currently set travel mode.

A plurality of operating elements are provided around the driver's seat 8a. Each of the operating elements is disposed within reach of the limbs of the driver on the driver's seat 8a, and is operated by the driver on the driver's seat 8a. The plurality of operating elements include, for example, a steering wheel 11, an accelerator pedal 12, a brake pedal 13, a parking lever (not illustrated), a shift lever (not illustrated), a mode switch 14, and a traveling speed adjustment switch 15.

Referring to FIG. 2, the mode switch 14 is an operating element for switching between travel modes. In the present specification, two travel modes that can be set in the utility vehicle 1 are exemplified: a manual travel mode and a control travel mode. The operation performed on the mode switch 14 to turn on the control travel mode (that is, to switch from the manual travel mode to the control travel mode) is referred to as an "ON operation", and the operation performed on the mode switch 14 to turn off the control travel mode (that is, to switch from the control travel mode to the manual travel mode) is referred to as an "OFF operation". The traveling speed adjustment switch 15 is an operating element that is enabled during the execution of the control travel mode and used to adjust (the target speed of) the traveling speed. The traveling speed adjustment switch 15 is divided into an up switch 15a that is operated to increase the traveling speed and a down switch 15b for decreasing the traveling speed. The types of the switches 14, 15a, and 15b are not particularly limited, and are realized by push-operated buttons as an example.

Referring to FIG. 2, the utility vehicle 1 includes an engine 20, a brake device 25, and a power transmission mechanism 30. The engine 20 is an example of a drive source that generates a driving force. The power transmission mechanism 30 transmits the driving force generated in the engine 20 to the wheels 2. The power transmission mechanism 30 includes a clutch 31, a continuously variable transmission (CVT) 32, a transmission 33, a differential device 36 (36F, 36R), and axles 37FR, 37FL, 37RR, and 37RL.

The number and arrangement of the cylinders of the engine 20 are not particularly limited. For example, the engine 20 is a multi-cylinder gasoline engine. The utility vehicle 1 is provided with an electronic throttle valve 21 that changes the degree of opening of an intake passage to adjust the intake air amount of the engine 20, a fuel injection valve 22 that injects fuel into the cylinders, and an ignition plug 23 that ignites an air-fuel mixture of intake air and fuel. Combustion of the air-fuel mixture rotates an engine output shaft (not illustrated) to generate a driving force. Hereinafter, the degree of opening of the intake passage is referred to as "throttle opening degree", and the revolutions per unit time of the engine output shaft is referred to as "engine rotational speed" or "engine speed".

The driving force is transmitted to the CVT 32 through the clutch 31, is speed-changed by the CVT 32, and is input to the transmission 33. If the engine speed is less than a predetermined engagement speed (for example, 2000 rpm), the clutch 31 is disengaged and the driving force is not transmitted to the CVT 32 and thus to the wheels 2. If the engine speed is equal to or higher than the engagement speed, the clutch 31 is engaged and the driving force is transmitted to the CVT 32. The CVT 32 is a V-belt type, and the speed ratio of the CVT 32 varies continuously.

Examples of the transmission 33 include a manual type, a parallel shaft type, and a dog clutch type. The transmission 33 selectively sets one of a plurality of shift positions in response to the operation of the shift lever by the driver. The plurality of shift positions include, for example, a forward high-speed position (H), a forward low-speed position (L), a reverse position (R), and a neutral position (N). The speed ratio is defined as a ratio of the rotational speed (numerator) of the input shaft of the transmission 33 to the rotational speed (denominator) of the output shaft of the transmission 33. The speed ratio of the forward low-speed position (L) is higher than the speed ratio of the forward high-speed position (H).

The rotation of the output shaft of the transmission 33 is transmitted to the wheels 2 (driving wheels) through the downstream portion of the power transmission mechanism 30 including the differential device 36 and the axles 37. The driving force is transmitted from the driving wheels to the road surface, and the utility vehicle 1 moves forward or backward. In the present embodiment, a two-wheel drive/four-wheel drive switching mechanism 38 (see FIG. 3) and a differential lock mechanism 39 (see FIG. 3) are provided downstream of the power transmission mechanism 30. Both of the mechanisms 38 and 39 may be electrically operated.

Figure 3:
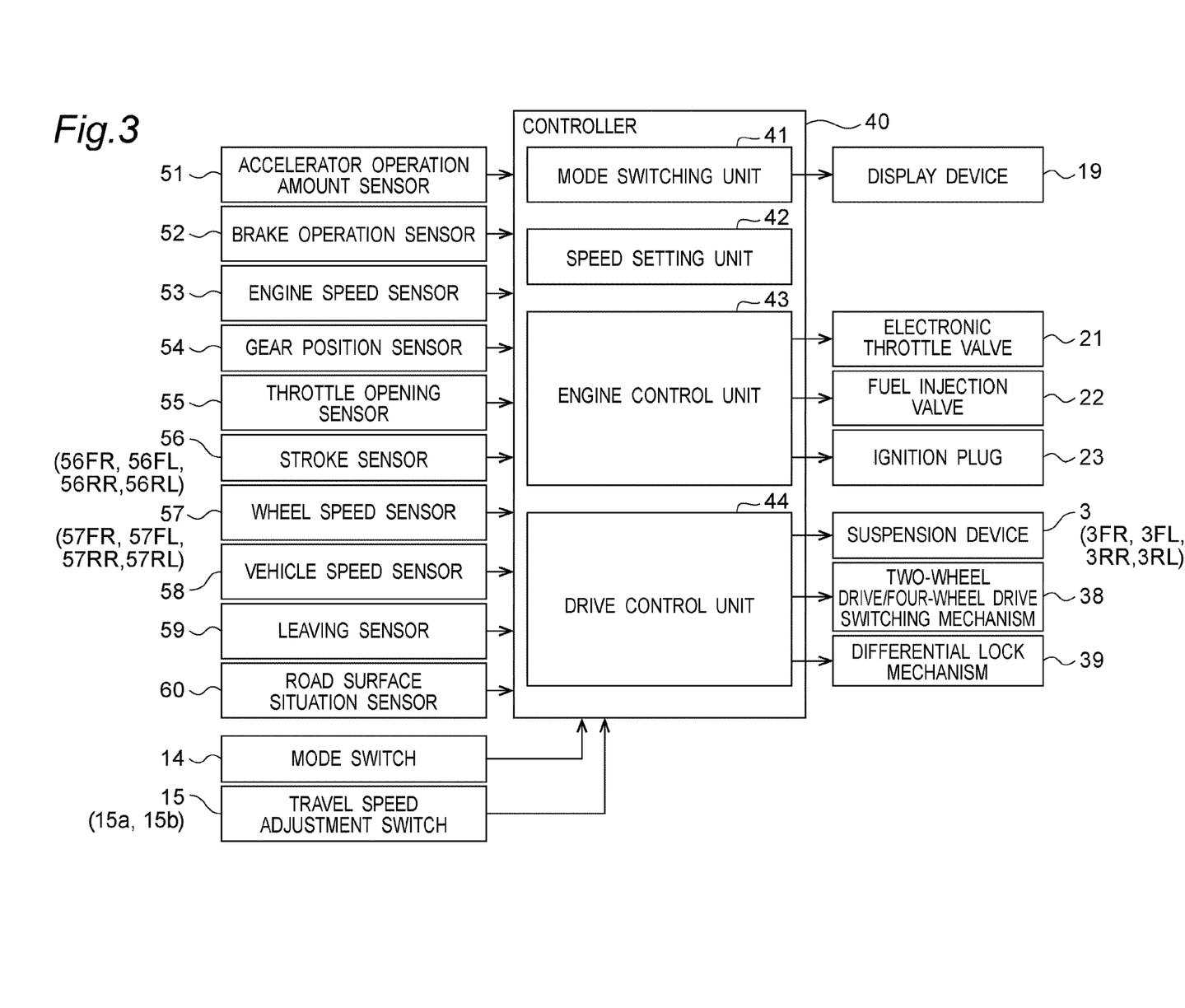
FIG. 3 is a conceptual diagram showing a control system of the utility vehicle shown in FIG. 1.

The two-wheel drive/four-wheel drive switching mechanism 38 is configured so as to be capable of electrical switching between a two-wheel drive state in which either the front wheels 2FR, 2FL or the rear wheels 2RL, 2RR serve as driving wheels and a four-wheel drive state in which all the four wheels 2 serve as driving wheels. Merely by way of example, in the two-wheel drive state, the rear wheels 2RR and 2RL serve as driving wheels, and the front wheels 2FR and 2FL serve as driven wheels. The differential lock mechanism 39 electrically switches the state of the differential device 36 between an open state and a locked state. The open state is a state in which the driving force is distributed to the left and right wheels 2 connected to the differential device 36 in accordance with the load acting on each of the left and right wheels 2. The locked state is a state in which the left and right wheels 2 sandwiching the differential device 36 are directly connected and the driving force is evenly distributed to the left and right wheels 2. The differential lock mechanism 39 may be capable of switching the state of the front differential device 36F and may be capable of switching the state of the rear differential device 36R.

The brake device 25 brakes the wheels 2 in response to the operation of the brake pedal 13 by the driver. The brake device 25 includes four friction brakes 25FR, 25FL, 25RR, and 25RL individually provided on the four wheels 2FR, 2FL, 2RR, and 2RL, respectively.

The utility vehicle 1 includes a controller 40. The functions realized by the components of the controller 40 described in the present specification may be implemented in a circuitry or processing circuitry that is programmed to realize the described functions. The circuitry or processing circuitry includes a general purpose processor, a specific purpose processor, an integrated circuit, an application specific integrated circuit (ASICs), a central processing unit (CPU), a conventional circuit, and/or a combination thereof. The processor includes a transistor and other circuits, and is regarded as the circuitry or processing circuitry. The processor may be a programmed processor that executes a program stored in a memory. In the present specification, a circuitry, means, or unit is hardware that is programmed to realize the functions described herein or that performs the functions described herein. The hardware may be any hardware disclosed herein, or any hardware programmed to realize the described functions or known to perform the described functions. In a case where the hardware is a processor regarded as one type of circuitry, the circuitry, means, or unit is a combination of hardware, and software that is used to configure the hardware and/or the processor.

Referring to FIGS. 2 and 3, the controller 40 is communicably connected to a plurality of sensors. The sensors output detection results to the controller 40. The plurality of sensors include an accelerator operation amount sensor 51, a brake operation sensor 52, an engine speed sensor 53, a gear position sensor 54, a throttle opening degree sensor 55, a stroke sensor 56 (56FR, 56FL, 56RR, 56RL), a wheel speed sensor 57 (57FR, 57FL, 57RR, 57RL), a vehicle speed sensor 58, a leaving sensor 59, and a road surface situation sensor 60.

The accelerator operation amount sensor 51 detects the amount of depression of the accelerator pedal 12 by the driver (hereinafter referred to as "accelerator operation amount"). The brake operation sensor 52 detects whether the brake pedal 13 is operated by the driver. The brake operation sensor 52 may be a hydraulic pressure sensor that detects the brake pressure that changes depending on whether or not the brake pedal 13 is operated. The engine speed sensor 53 detects the engine speed. The gear position sensor 54 detects the shift position set by the transmission 33. The throttle opening degree sensor 55 detects the throttle opening degree. The stroke sensor 56 detects the stroke of the corresponding suspension device 3. The wheel speed sensor 57 detects the rotational speed of the corresponding wheel 2.

The vehicle speed sensor 58 detects the traveling speed of the utility vehicle 1 (that is, the speed at which the vehicle body moves relative to the ground). The vehicle speed sensor 58 may be realized by the receiver of a satellite PNT system or an inertial measurement unit (IMU). The vehicle speed sensor 58 may be realized by the wheel speed sensor 57 described above. The leaving sensor 59 detects that an occupant (driver or passenger) has left the seat 8a or 8b. The leaving sensor 59 may be realized by a belt sensor that detects the detachment of a seat belt (not illustrated), door sensor that detects the opening movement of the side doors 7 (see FIG. 1), or a seat sensor that detects the seating load acting on the seats 8a and 8b. The leaving sensor 59 may be realized by the stroke sensor 56 described above.

The road surface situation sensor 60 detects road surface situations. For example, the road surface situation sensor 60 detects whether the vehicle is traveling on a slope or an uneven road (including a rocky area) and whether the vehicle is traveling on a low μ road. In order to detect a slope or an uneven road, the road surface situation sensor 60 may be realized by the IMU or the stroke sensor 56 described above. In order to detect the low μ road, the road surface situation sensor 60 may be realized by the wheel speed sensor 57 described above.

Furthermore, the controller 40 is also connected to the mode switch 14 and the traveling speed adjustment switch 15 (the up switch 15a and the down switch 15b). When the switches 14 and 15 are operated by the driver, a signal indicating the operation is output to the controller 40.

Referring to FIG. 3, the controller 40 has a mode switching unit 41, a speed setting unit 42, an engine control unit 43, and a drive control unit 44.

The mode switching unit 41 controls the switching, setting, or transitioning between the travel modes. The controller 40 has at least the manual travel mode and the control travel mode as selectively settable travel modes. In the manual travel mode, the output of the engine 20 is controlled in accordance with the accelerator operation amount. In the control travel mode, the output of the engine 20 is controlled so that the traveling speed is maintained at a target speed within a predetermined speed range SR (see FIG. 4).

When the ON operation is performed on the mode switch 14 during the execution of the manual travel mode, the mode switching unit 41 determines whether or not a mode transition condition for the transition of the travel mode from the manual travel mode to the control travel mode is satisfied. In the present embodiment, the mode transition condition does not include the condition that the vehicle is stopped. In other words, the transition to the control travel mode is possible even during traveling. For example, the mode transition condition includes a condition that the shift position is the forward low-speed position (L). The mode switching unit 41 monitors the detection result from the gear position sensor 54 and determines whether or not the condition is satisfied.

It should be noted that the accelerator pedal 12 is an example of an output operating element that is operated by a driver and receives an increase/decrease instruction to increase or decrease the driving force. The mode switch 14 is an example of a switching operating element that receives a switching instruction for switching between travel modes.

As an example of work using the utility vehicle 1, there is the work of spraying material to be sprayed such as a fertilizer while traveling. In this case, if the traveling speed is disturbed, the distribution of the sprayed material is disturbed. Therefore, in the case of such spraying work, it is required to continue traveling at a constant traveling speed, more specifically, at a low traveling speed, in order to homogenize the distribution of the sprayed material. In order to keep the traveling speed constant, it is necessary to continue to adjust the driving force so as to keep a state in which the driving force is balanced with the running resistance and. On off roads, such as a farms, the unevenness, gradient, and coefficient of friction of the road surface change largely, resulting in large fluctuations in running resistance. In order to keep the traveling speed constant in the manual travel mode, delicate accelerator work is forced for a long time. Furthermore, the spray density varies depending on the type of material to be sprayed, and the traveling speed to be maintained may vary depending on the work content. Achieving a constant arbitrary traveling speed requires high driving skills. Meanwhile, in the control travel mode, the output of the engine 20 is controlled so that the traveling speed is maintained. Therefore, this complicated driving operation can be eliminated, and the driving operation can be simplified.

When the OFF operation is performed on the mode switch 14 during the execution of the control travel mode, the mode switching unit 41 returns the travel mode from the control travel mode to the manual travel mode. During the execution of the control travel mode, the mode switching unit 41 determines whether or not a mode return condition for returning the travel mode from the control travel mode to the manual travel mode is satisfied.

For example, the mode return condition includes a condition that the operation of the accelerator pedal 12 by the driver is stopped (the accelerator pedal 12 is not operated). The accelerator pedal 12 is an example of a continuation operating element that receives a continuation instruction to continue the control travel mode, and the output operating element also serves as the continuation operating element. The mode return condition includes a condition that an occupant has left the seat 8a or 8b. The mode return condition may include a condition that an operation for switching the differential device 36 to the locked state has been performed and a condition that an operation for switching between the two-wheel drive state and the four-wheel drive state has been performed.

In addition, while the control travel mode is set, the mode switching unit 41 controls the display device 19 to display that fact.

The speed setting unit 42 sets a target speed as a target value of the traveling speed during the execution of the control travel mode. When the travel mode transitions to the control travel mode, the speed setting unit 42 sets the target speed to an initial value. The initial value is typically a default value, and a median value of the speed range SR can be exemplified as the default value. The initial value may be a customized value previously input by the driver. Both the default value and the customized value are stored in the memory area of the controller 40 together with the upper limit value CVmax and the lower limit value CVmin of the speed range SR (see FIG. 4). There may be a plurality of the default values and a plurality of the customized values. In this case, the driver or the controller 40 may select an initial value from one or more default values and one or more customized values. If the traveling speed at the time of transition to the control travel mode is within the speed range SR, the traveling speed at this time may be set as an initial value, and the mode transition condition may include a condition that the current traveling speed is within the speed range SR.

The speed setting unit 42 increases or decreases the target speed within the speed range SR in response to an operation on the traveling speed adjustment switch 15. When the up switch 15a is operated by the driver, the speed setting unit 42 updates and sets the target speed to a numerical value obtained by increasing the current value by a predetermined range $\Delta V$ (for example, 1 mile per hour). When the down switch 15b is operated by the driver, the speed setting unit 42 updates and sets the target speed to a numerical value obtained by reducing the current value by the predetermined range $\Delta V$. However, the increase and decrease in the target speed are limited by the upper limit value CVmax and the lower limit value CVmin of the speed range SR.

Figure 4:
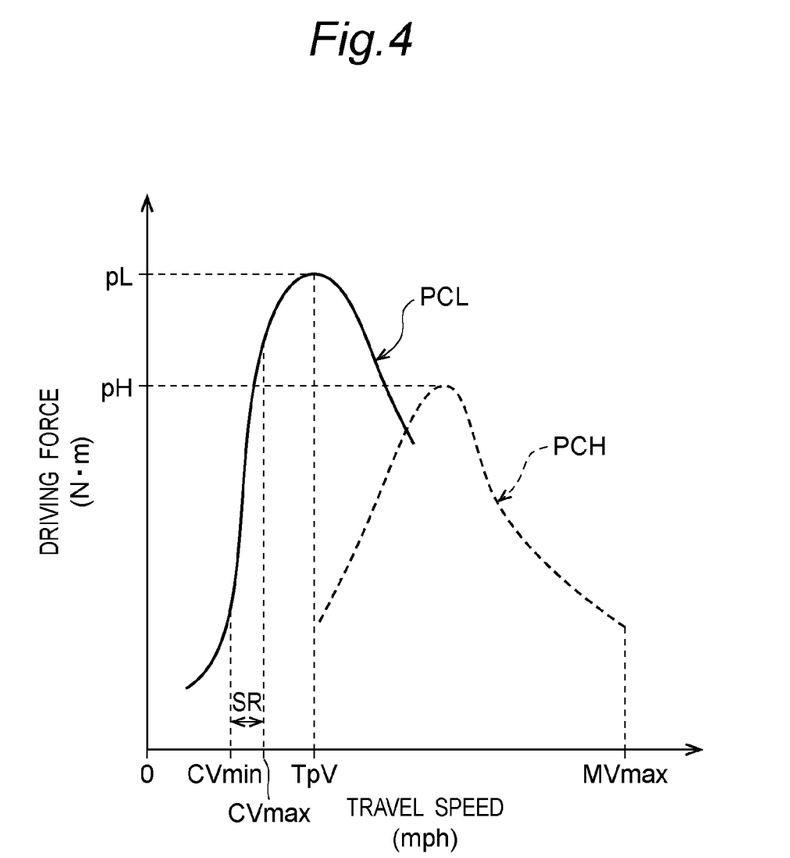
FIG. 4 is a graph showing a speed range set in a control travel mode.

Referring to FIG. 4, for example, the speed range SR is set to a low speed region relative to the peak pL of the traveling performance curve PCL of the vehicle. The traveling performance curves PCL and PCH are lines showing the driving force (vertical axis) with respect to the traveling speed (horizontal axis) for each shift position. The solid line indicates the curve PCL corresponding to the forward low-speed position (L), and the broken line indicates the curve PCH corresponding to the forward high-speed position (H). Each of the curves PCL and PCH is generally convex upward and has a peak pL, pH. The "low-speed region" is represented as a region where the traveling speed is less than the traveling speed TpV at which the driving force peaks. That is, the region is represented as a left region in a two-dimensional orthogonal coordinate system in which the traveling speed is taken on the horizontal axis. In the present embodiment, the control travel mode is executed while the forward low-speed position (L) is set (see the mode transition condition). Therefore, the speed range SR is set with reference to the traveling performance curve PCL for the forward low-speed position (L) indicated by the solid line. The upper limit CVmax of the speed range SR is lower than the upper limit MVmax (for example, 90 miles per hour) of the traveling speed set in advance in the manual travel mode.

In this manner, in the control travel mode, the traveling speed is maintained at the speed designated by the driver in the relatively low traveling speed region. Merely by way of example, the upper limit CVmax of the speed range SR is a speed value of 30 miles per hour (48 kilometers per hour) or less, preferably 20 miles per hour or less.

The lower limit value CVmin of the speed range SR is set to a traveling speed that can be achieved by the power transmission mechanism 30 when the engine speed is the engagement speed and the forward low speed position (L) is set, or a speed value slightly higher than the traveling speed. Merely by way of example, the lower limit Vmin of the speed range SR is a speed value of 1 mile per hour (1.6 kilometers per hour) or greater, preferably 2 miles per hour or greater.

However, instead of the speed range SR, an engine speed range may be set. The engine speed range may be set on the basis of a performance curve in which the engine speed is taken on the horizontal axis and the driving force (torque) is taken on the vertical axis. The torque of the engine 20 increases until the engine speed reaches a predetermined peak speed from the idling speed. In addition, the torque decreases as the engine speed increases further from the peak speed. In a case where the power transmission mechanism 30 includes a transmission, the performance curve is set for each speed ratio. The upper limit value of the engine speed range may be set to be lower than the peak speed (the engine speed at which the torque becomes maximum), that is, may be set within a region where the torque increases with an increase in the engine speed. The engine speed range may be set to a value corresponding to the speed range of the vehicle in response to the speed ratio shift. Furthermore, instead of the speed range SR, a torque range may be set, and the torque may be controlled so as to be maintained within a predetermined torque range. The control of the traveling speed using the speed range SR may be performed simultaneously with the control of engine speed or torque using the engine speed range and/or the torque range.

The engine control unit 43 controls the driving force generated in the engine in accordance with the travel mode. During the execution of the manual travel mode, the electronic throttle valve 21 is controlled such that the throttle opening degree is proportional to the accelerator operation amount, and the fuel injection valve 22 is controlled such that the fuel injection amount increases in accordance with the increase in the accelerator operation amount. The accelerator operation amount (that is, the increase/decrease instruction input to the output operating element) is reflected in the driving force generated in the engine 20.

During the execution of the control travel mode, the engine control unit 43 controls the electronic throttle valve 21, the fuel injection valve 22, and the ignition plug 23 such that the traveling speed follows the target speed regardless of the accelerator operation amount, although the condition for continuing the control travel mode is that the accelerator pedal 12 is in the operating state. The engine control unit 43 controls the electronic throttle valve 21, the fuel injection valve 22, and the ignition plug 23 such that the increase or decrease of the driving force increases as the detection value of the traveling speed detected by the vehicle speed sensor 58 deviates from the target speed. However, in order to prevent a sudden change in output, the range of output increase/decrease and the amount of output increase/decrease per unit time may be limited.

In a case where the detection value becomes larger than the target speed and it is necessary to suppress the driving force, the engine control unit 43 may execute cylinder cut-off control to cut off some of the cylinders. This can prevent excessive output during traveling in the control travel mode. It should be noted that in such a case, the controller 40 may operate the brake device 25. Off-road, there are likely to be many occasions where the detection value increases suddenly relative to the target speed due to a rocky place or a downhill. These controls are effective in maintaining a relatively low traveling speed in such situations.

The drive control unit 44 controls various actuators that change the ease of transmission of the driving force to the road surface of the wheels 2. During the execution of the control travel mode, the drive control unit 44 improves the ease of transmission of the driving force from the wheels 2 to the road surface as compared with during the execution of the manual travel mode. Specifically, examples of the actuators controlled by the drive control unit 44 include the electric suspension device 3, the two-wheel drive/four-wheel drive switching mechanism 38, and the differential lock mechanism 39. In the case of the suspension device 3, the suspension stroke is extended. In the case of the two-wheel drive/four-wheel drive switching mechanism 38, the power transmission mechanism 30 is switched from the two-wheel drive state to the four-wheel drive state. In the case of the differential lock mechanism 39, the differential device 36 is switched from the open state to the locked state.

Figure 5:
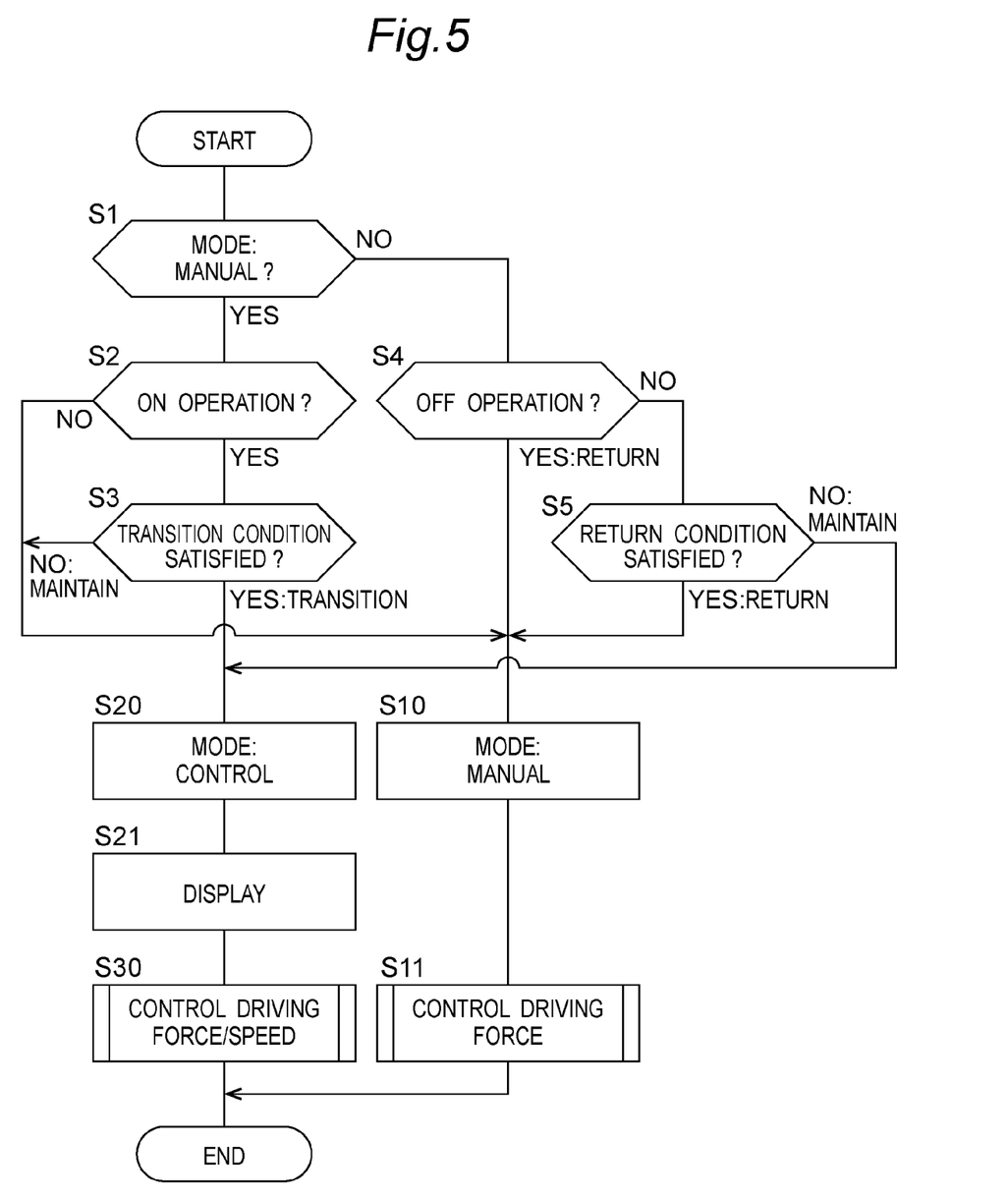
FIG. 5 is a flowchart showing a process executed in the control system.

Next, processing executed in the controller 40 will be described with reference to FIGS. 5 to 7. The illustrated process is repeatedly executed at a predetermined control cycle (for example, 5 msec) while the utility vehicle 1 is traveling.

If the manual travel mode is set (S1: Y), the mode switching unit 41 determines whether or not the driver has performed an ON operation on the mode switch 14 (S2). If the ON operation is performed (S2: Y), the mode switching unit 41 determines whether or not the mode transition condition is satisfied (S3). It should be noted that the mode transition condition is as described above.

If the ON operation is not performed (S2: N) or if the mode transition condition is not satisfied (S3: N), the mode switching unit 41 maintains the travel mode in the manual operation mode and prohibits the transition from the manual travel mode to the control travel mode (S10). When the manual travel mode is set, the engine control unit 43 controls the driving force generated in the engine 20 according to the manual operation mode (S11).

If the mode transition condition is satisfied (S3: Y), the mode switching unit 41 causes the travel mode to transition from the manual travel mode to the control travel mode (S20). When the control travel mode is set, the mode switching unit 41 causes the display device 19 to display that the travel mode is set to the control travel mode (S21). With such display, the driver can ascertain the completion of the mode transition. In addition, with the non-responsiveness of the display device 19 despite the ON operation, the driver also can ascertain that the mode transition is prohibited. Then the controller 40 controls the driving force generated in the engine 21 such that the traveling speed is maintained at the target speed according to the control travel mode (S30).

Figure 6:
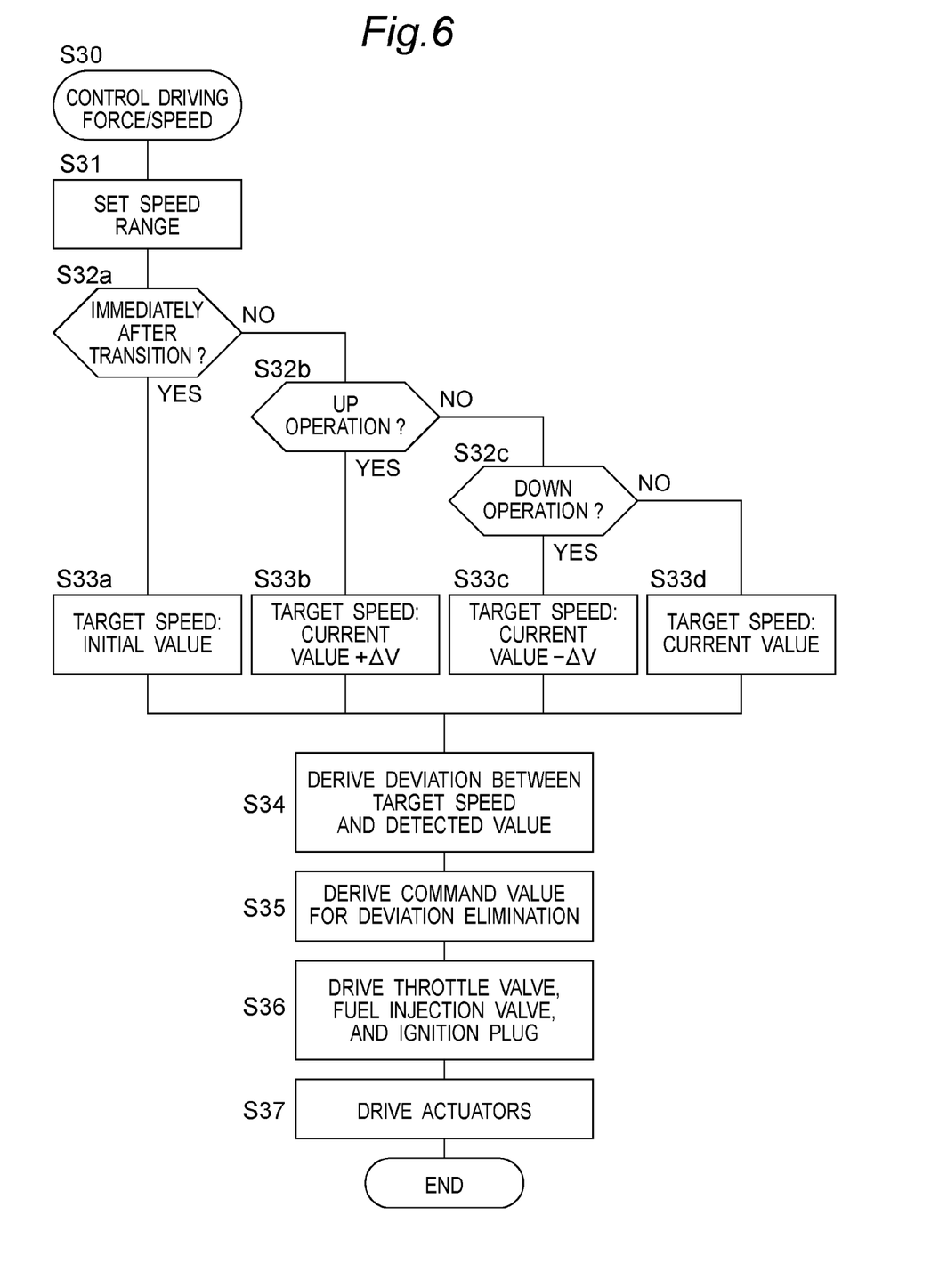
FIG. 6 is a flowchart showing a process for driving force/speed control shown in FIG. 5.

Referring to FIG. 6, during the execution of the control travel mode, the speed setting unit 42 sets the speed range SR (S31). The upper limit value CVmax and the lower limit value CVmin may be default values stored in the memory area of the controller 40 in advance. The speed setting unit 42 may correct the default value in accordance with the road surface situation on the basis of the detection result from the road surface situation sensor 60 and set the corrected value as the upper limit value CVmax and/or the lower limit value CVmin.

Next, the speed setting unit 42 sets the target speed in accordance with the situation. First, the speed setting unit 42 determines whether or not the current process is a process immediately after the transition to the control travel mode (S32a). In the case of the process immediately after the transition (S32a: Y), the target speed is set to an initial value (S33a). It should be noted that the initial value of the target speed is as described above. In the case of the second and subsequent processes (S32a: N), the speed setting unit 42 determines whether or not the up switch 15a or the down switch is operated by the driver (S32b, S32c). If neither the up switch 15a nor the down switch 15b is operated (S32b: N and S32c: N), the target speed is maintained at the current value (that is, the value set in the previous process) (S33d). If the up switch is operated (S32b: Y), the target speed is set to a value obtained by increasing the current value by the predetermined range ΔV (S33b). If the down switch 15b is operated (S33c: Y), the target speed is set to a value obtained by decreasing the current value by the predetermined range ΔV (S33c).

Next, the engine control unit 43 derives a deviation between the set target speed and the detection value of the traveling speed with reference to the detection result of the vehicle speed sensor 58 (S34). Next, the engine control unit 43 derives the operation command values of the electronic throttle valve 21, the fuel injection valve 22, and the ignition plug 23 in order to eliminate the deviation (S35). At this time, the engine control unit 43 may refer to the detection results of the engine speed sensor 53, the gear position sensor 54, the throttle opening degree sensor 55, and the road surface situation sensor 60 together with the deviation, and derive the operation commands in consideration of these detection results. Next, the engine control unit 43 controls the drive of the electronic throttle valve 21, the fuel injection valve 22, and the ignition plug 23 according to the derived operation command values (S36). As a result, the traveling speed can follow the target speed.

Next, the drive control unit 44 controls the drive of the actuators with reference to the detection result of the road surface situation sensor 60 and the like (S 37). As an example, the suspension stroke is extended, and the two-wheel drive state is switched to the four-wheel drive state.

Referring back to FIG. 5, if the control travel mode is set (S1: N), the mode switching unit 41 determines whether or not the driver has performed an OFF operation on the mode switch 14 (S4). If the OFF operation is not performed (S4: N), the mode switching unit 41 determines whether or not the mode return condition is satisfied (S5).

If the mode return condition is not satisfied (S5: N), the mode switching unit 41 maintains the travel mode in the control travel mode (S20), the display indicating the fact is continued on the display device 19 (S21), and the process shown in FIG. 6 is repeated.

If the OFF operation is performed (S4: Y) or if the mode return condition is satisfied (S5: Y), the mode switching unit 41 returns the travel mode from the control travel mode to the manual travel mode (S10). Thus, the display indicating that the control travel mode is set disappears on the display device 19, and the engine control unit 43 controls the driving force generated in the engine 20 on the basis of the accelerator operation amount (S11).

Figure 7:
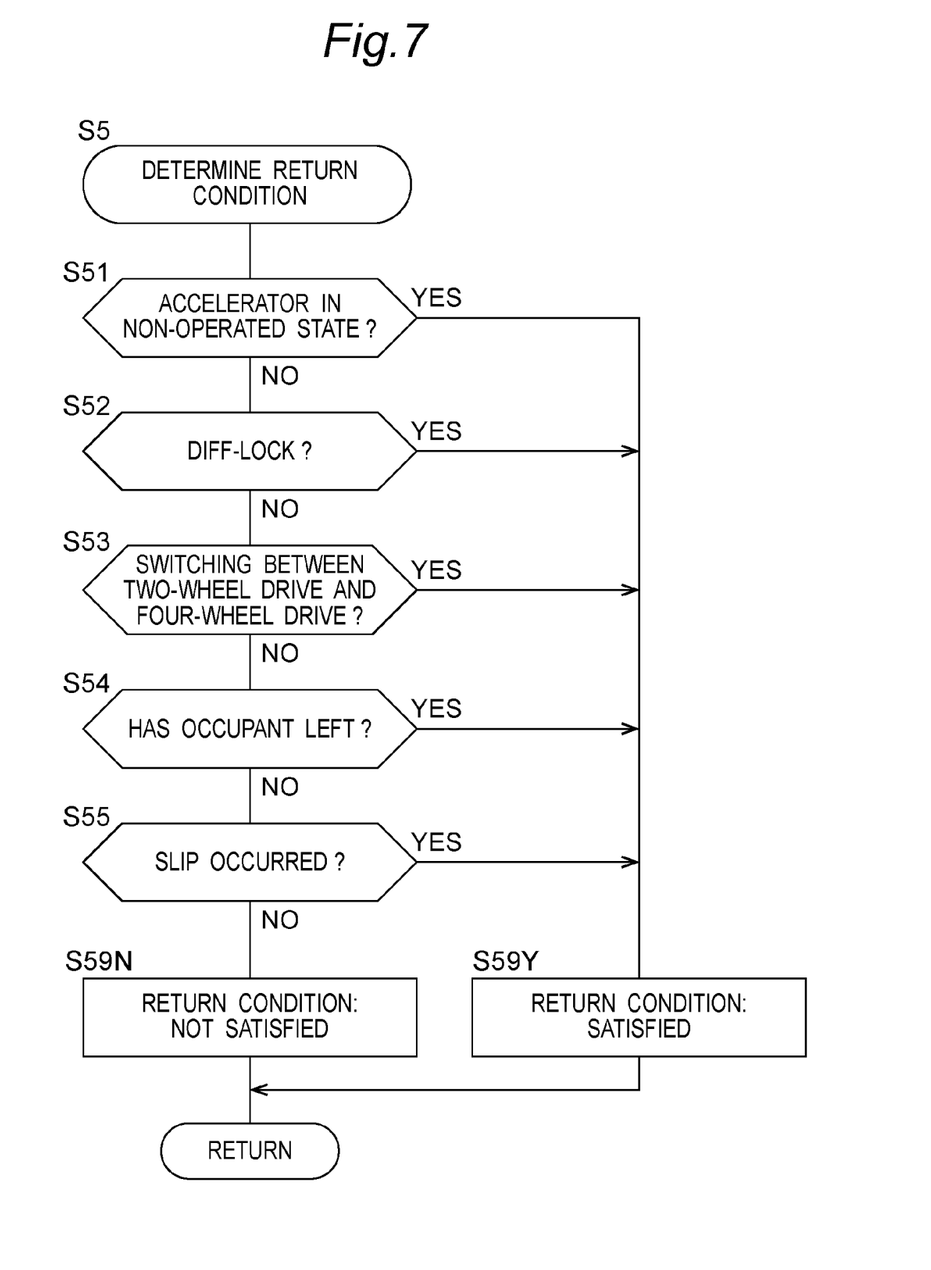
FIG. 7 is a flowchart showing a process for determining whether or not a mode return condition is satisfied as shown in FIG. 5.

Referring to FIG. 7, as already briefly described, the mode switching unit 41 determines whether or not a plurality of conditions are satisfied, in order to determine whether or not the mode return condition is satisfied. For example, the mode switching unit 41 determines whether or not the accelerator pedal 12 is in a non-operated state on the basis of the detection result of the accelerator operation amount sensor 51 (S51).

In addition, the mode switching unit 41 determines whether the differential lock mechanism 39 has activated (S52). The mode switching unit 41 determines whether or not the switching between the two-wheel drive state and the four-wheel drive state has been performed (S53). The mode switching unit 41 determines whether or not an occupant has left during traveling on the basis of the detection result of the leaving sensor 59 (S54). The mode switching unit 41 determines whether or not a slip has occurred in the wheels 2 on the basis of the detection result of the road surface situation sensor 60 (S55). If any one of the plurality of conditions is satisfied, the mode switching unit 41 determines that the mode return condition is satisfied (S59Y, S5: Y), and sets the travel mode to the manual travel mode (S10). If none of the plurality of conditions is satisfied, the mode switching unit 41 determines that the mode return condition is not satisfied (S59N, S5: N), and maintains the travel mode in the control travel mode (S20).

As described above, in the utility vehicle 1 according to the present embodiment, the traveling speed is maintained at the target speed regardless of the accelerator operation amount as long as the driver steps on the accelerator pedal 12. Therefore, the driving operation can be simplified. The target speed can be changed by a switch operation by the driver. Therefore, usability is good. The target speed is limited within the speed range SR. Therefore, the vehicle can travel while maintaining a low traveling speed.

In addition, since the wheels 2 are mounted with the low-pressure tires, the ground contact area between the road surface and the wheels 2 can be relatively increased as compared with the case where high-pressure tires are mounted. As a result, when the road surface resistance fluctuates due to uneven road surfaces, the range of fluctuations in the driving force required for the vehicle to maintain the traveling speed is suppressed. Therefore, the traveling speed can be easily maintained at the target speed even on the off road.

The control travel mode is continued when a continuation command is input to the continuation operating element (in this example, the accelerator pedal is operated), and is ended when the continuation command is stopped (in this example, the accelerator pedal is not operated). Therefore, it is easy to prevent the control travel mode from being continued unintentionally by the driver. The output operating element (in this example, the accelerator pedal) which is originally intended to receive an increase/decrease command for increasing or decreasing the driving force also serves as the continuation operating element. Therefore, it is possible to prevent an increase in the number of components. In addition, since the original output increase/decrease command is substituted as the continuation command, the driver can operate the continuation/stop of the control travel mode without feeling uncomfortable. It should be noted that in a case where the output operating element is separate from the continuation operating element, the continuation operating element may be, for example, a contact sensor provided on the steering wheel 11, and in this case, the driver can input the continuation command of the control travel mode only by touching the steering wheel 11.

Since the upper limit value CVmax of the speed range SR is lower than the upper limit value MVmax in the manual travel mode, off-road traveling stability is enhanced during the execution of the control travel mode. With the upper limit value CVmax, it is easier to suppress shock during the transition of the travel mode. Furthermore, the speed range SR is set on the basis of the traveling performance curve PCL as shown in FIG. 4, and the control travel mode is executed in a state where the driving force is suppressed. Therefore, it is easy to suppress the slip of the wheels 2. Even if idling occurs in any of the wheels 2 due to uneven road surfaces, the increase in the rotational speed of the wheels 2 can be suppressed. In addition, there remains room for increasing the driving force during the control. Therefore, when the vehicle approaches the convex road surface during traveling, the driving force is instantaneously increased, and the vehicle can get over the convex road surface while keeping the traveling speed constant. Setting the speed range SR as described above is particularly advantageous for the utility vehicle 1 that frequently travels off-road.

In changing the driving force in order to cause the traveling speed to follow the target speed, the controller 40 drives the electronic throttle valve 21 to control the throttle opening. The driving force is easily changed, and the traveling speed is easily made to follow the target speed.

Figure 8:
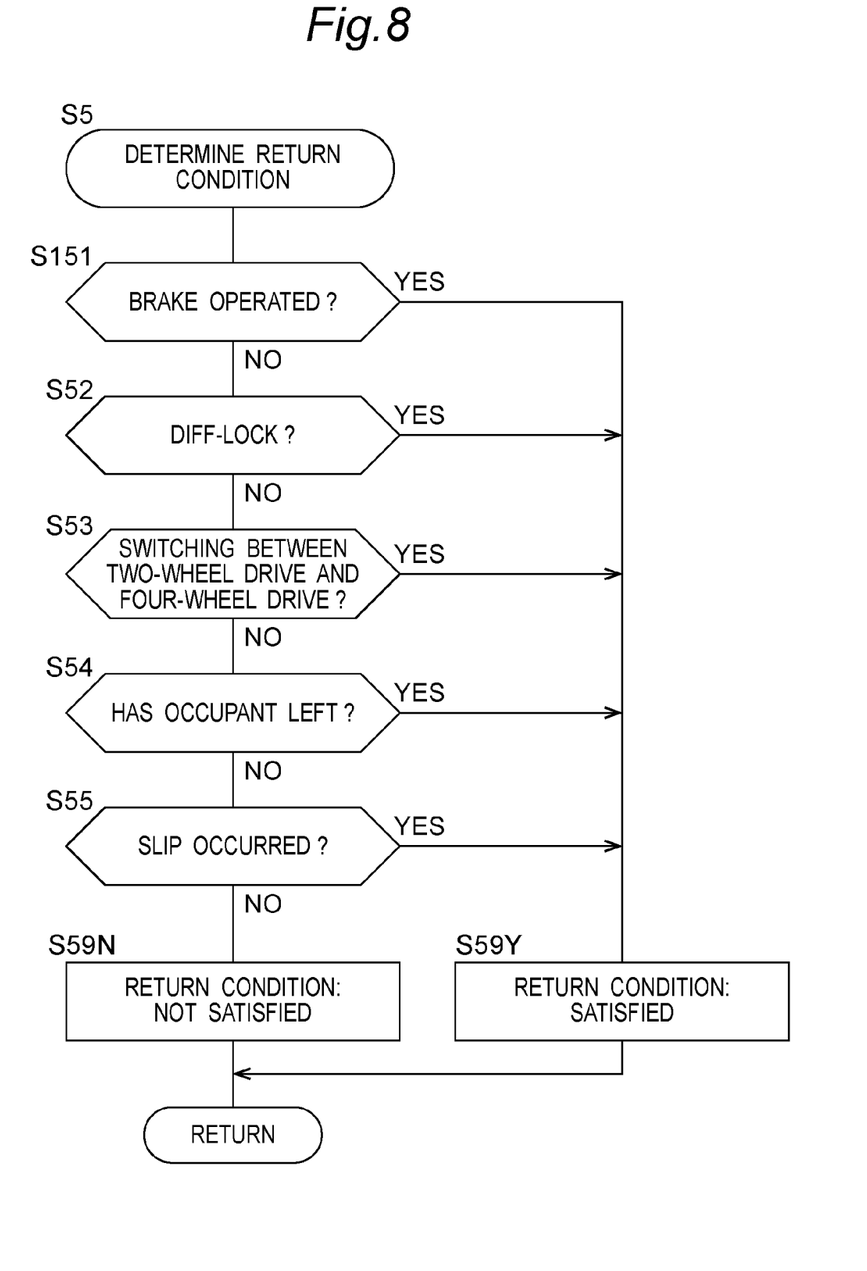
FIG. 8 is a flowchart showing a process executed in a control system of a utility vehicle according to a second embodiment.

A second embodiment will be described with reference to FIG. 8, focusing on a difference from the above embodiment. In the present embodiment, the condition that the accelerator pedal 12 is not operated in the above embodiment is deleted from the plurality of conditions constituting the mode return condition. Instead, the condition that the brake pedal 13 is operated is added (S151). The brake pedal 13 is an example of a stop operating element that is operated by the driver and receives a stop instruction to stop the control travel mode.

According to the present embodiment, even with the driver's foot off the accelerator pedal 12, the utility vehicle 1 can continue traveling while maintaining a low traveling speed. The driving operation is further simplified. In addition, when the brake pedal 13 is instantaneously depressed, the control travel mode is automatically released and the traveling speed is reduced, so that usability is good.

Although the embodiments of the present invention have been described so far, the above configurations can be appropriately changed, added, and deleted within the scope of the gist of the present invention.

The mode transition condition may include a condition that the vehicle is stopped. That is, the mode transition may be prohibited during traveling. Furthermore, the mode transition condition may include a condition that the traveling speed is within a predetermined range. Thus, if the traveling speed is too high or too low, the mode transition is prohibited. The mode transition condition may include a condition that the vehicle is not stuck and a condition that the inclination angle of the vehicle body is less than a predetermined value.

The mode transition condition may be a condition that the forward position (L, H) is set. The mode transition condition may include a condition that the reverse position is set. In this case, the target speed and the speed range SR are preferably different for each shift position.

The upper limit value CVmax of the speed range SR may be changed according to the orientation of the vehicle body or the state of the wheels 2. For example, the upper limit value CVmax may be made smaller as the change in orientation is larger and the wheels 2 are more likely to get stuck or slip. The upper limit value CVmax of the speed range SR may not be particularly set, and the upper limit value MVmax of the manual travel mode may be used.

The travel modes are not limited to the above two modes, and a traction control mode for preventing slip, or the like may be settable separately from the above two modes. The driving source that generates the driving force is not limited to only the engine 20, and may be configured by an electric motor instead of the engine 20 or in addition to the engine 20. That is, the utility vehicle 1 may be a hybrid vehicle or an electric-powered vehicle.

What is claimed is:

1. A utility vehicle comprising:
   a plurality of wheels mounted with low-pressure tires;
   a drive source that generates a driving force for rotationally driving the plurality of wheels;
   an output operating element that is operated by a driver and receives an increase/decrease instruction to increase or decrease the driving force;
   a switching operating element that is operated by the driver and receives a switching instruction for switching between travel modes;
   a controller that stores an upper limit value and a lower limit value of a predetermined speed range, and has a manual travel mode in which the driving force is controlled in accordance with an amount of operation on the output operating element, and a control travel mode in which the driving force is controlled so as to maintain a travel speed at a target speed that is set between the upper limit value and the lower limit value of the predetermined speed range, the control travel mode being executed in response to an input on the switching operating element; and
   a power transmission mechanism that transmits the driving force generated in the drive source to the plurality of the wheels when a rotational speed of the drive source is equal to or higher than a predetermined engagement speed, wherein
   the predetermined speed range is set in a low speed region relative to a peak of a travel performance curve that indicates the driving force with respect to the travel speed, and
   the lower limit value of the predetermined speed range is set to a speed value equivalent to a traveling speed that can be achieved by the power transmission mechanism with the rotational speed of the drive source being equal to the predetermined engagement speed and a forward low-speed position being set in the power transmission mechanism, or a speed value higher than the traveling speed.

2. The utility vehicle according to claim 1, wherein the upper limit value of the predetermined speed range is lower than an upper limit value of a traveling speed set in the manual travel mode, and the lower limit value of the predetermined speed range is a speed value of 1 mile per hour or greater.

3. The utility vehicle according to claim 1, wherein the upper limit value of the predetermined speed range is set at 30 miles per hour or less, and the lower limit value of the predetermined speed range is set at 1 mile per hour or greater.

4. The utility vehicle according to claim 3,
   wherein the controller changes the target speed within the predetermined speed range in response to an operation by the driver.

5. The utility vehicle according to claim 1, wherein
   the power transmission mechanism selectively sets one of a plurality of shift positions including a high-speed position and a low-speed position, and a speed ratio of the low-speed position is higher than a speed ratio of the high-speed position, and
   the control travel mode is executed while the low-speed position is set in the power transmission mechanism.

6. The utility vehicle according to claim 1, further comprising a continuation operating element that is operated by the driver and receives a continuation instruction to continue the control travel mode,
   wherein the controller returns from the control travel mode to the manual travel mode when the input on the continuation operating element is stopped during the execution of the control travel mode.

7. The utility vehicle according to claim 6, wherein the output operating element also serves as the continuation operating element.

8. The utility vehicle according to claim 1, further comprising a stop operating element that is operated by the driver and receives a stop instruction to stop the control travel mode,
   wherein the controller maintains the travel speed within the predetermined speed range even when the output operating element is not operated during the execution of the control travel mode, and returns from the control travel mode to the manual travel mode in response to an input from the stop operating element.

9. The utility vehicle according to claim 1, wherein upon determining that the driver has left a driver's seat, the controller returns from the control travel mode to the manual travel mode.

10. The utility vehicle according to claim 1, wherein the controller prohibits a transition to the control travel mode regardless of the input on the switching operating element when a predetermined mode transition condition is not satisfied.

11. The utility vehicle according to claim 10, further comprising:
    a roll over protective structure (ROPS) surrounding a boarding space;
    a passenger seat for a passenger that is installed in the boarding space; and
    a grip to be gripped by the passenger that is provided around the passenger seat,
    wherein the utility vehicle is configured to be capable of traveling off-road.

12. The utility vehicle according to claim 1, further comprising:
    a suspension device configured to be capable of changing a suspension stroke; and
    a two-wheel/four-wheel drive switching mechanism configured to be capable of switching between a two-wheel drive state and a four-wheel drive state, wherein the control travel mode is executed in the four-wheel state or in a state where the suspension stroke is extended.

13. The utility vehicle according to claim 1, wherein the controller changes the upper limit value of the predetermined speed range so as to be smaller as a change of a vehicle body orientation increases, or as the wheels become more likely to get stuck or slip.

14. A method for controlling a utility vehicle including a plurality of wheels mounted with low-pressure tires,
a drive source that generates a driving force for rotationally driving the plurality of wheels,
an output operating element that is operated by a driver and receives an increase/decrease instruction to increase or decrease the driving force,
a switching operating element that is operated by the driver and receives a switching instruction for switching between travel modes,
a power transmission mechanism that transmits the driving force generated in the drive source to the plurality of the wheels when a rotational speed of the drive source is equal to or higher than a predetermined engagement speed,
the method comprising:
executing a manual travel mode in which the driving force is controlled in accordance with an amount of operation on the output operating element;
switching from the manual travel mode to a control travel mode in response to an input on the switching operating element;
controlling, in the control travel mode, the driving force so as to maintain a travel speed at a target speed that is set between an upper limit value and a lower limit value of a predetermined speed range, the upper limit value and the lower limit value being stored in a controller;
deriving a deviation between the target speed and the traveling speed; and
deriving an operation command value of the driving source in order to eliminate the deviation
wherein the predetermined speed range is set in a low speed region relative to a peak of a travel performance curve that indicates the driving force with respect to the travel speed, and
the lower limit value of the predetermined speed range is set to a speed value equivalent to a traveling speed that can be achieved by the power transmission mechanism with the rotational speed of the drive source being equal to the predetermined engagement speed and a forward low-speed position being set in the power transmission mechanism, or a speed value higher than the traveling speed.

15. The utility vehicle according to claim 1, wherein the controller returns from the control travel mode to the manual travel mode when a switch of a differential device state has been performed, a switching between a two-wheel drive state and a four-wheel drive state has been performed, or a slip has occurred in the wheels.

16. The method according to claim 14, further comprising changing the target speed within the predetermined speed range in response to an operation by the driver.

17. The method according to claim 14, further comprising changing the upper limit value of the predetermined speed range so as to be smaller as a change of a vehicle body orientation increases, or as the wheels become more likely to get stuck or slip.

* * * * *